Oct. 12, 1965  B. UCINHASKA  3,211,114
ROTARY KNIFE ASSEMBLY FOR INJECTING LIQUID INTO THE SOIL
Filed Sept. 16, 1963  2 Sheets-Sheet 1
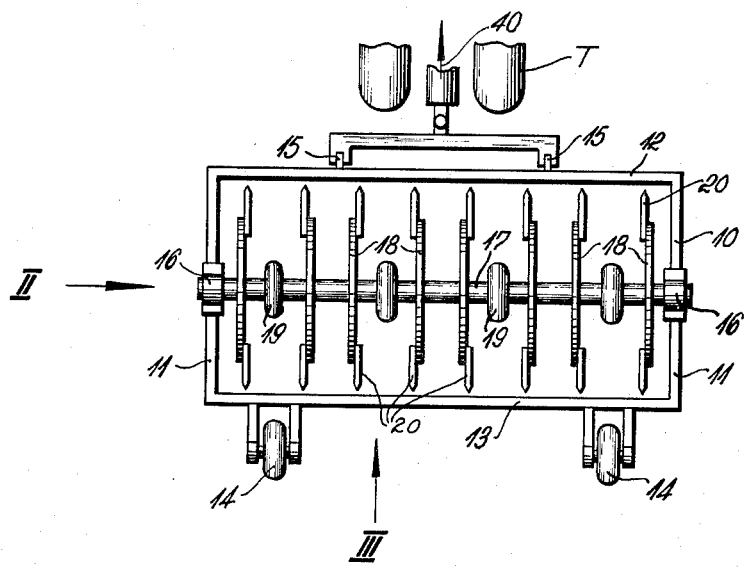
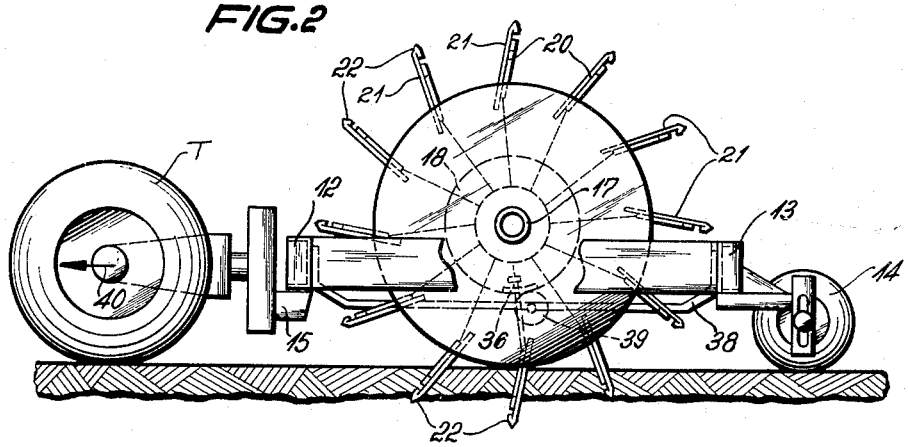
INVENTOR
BRUNO UCINHASKA
ATTORNEY

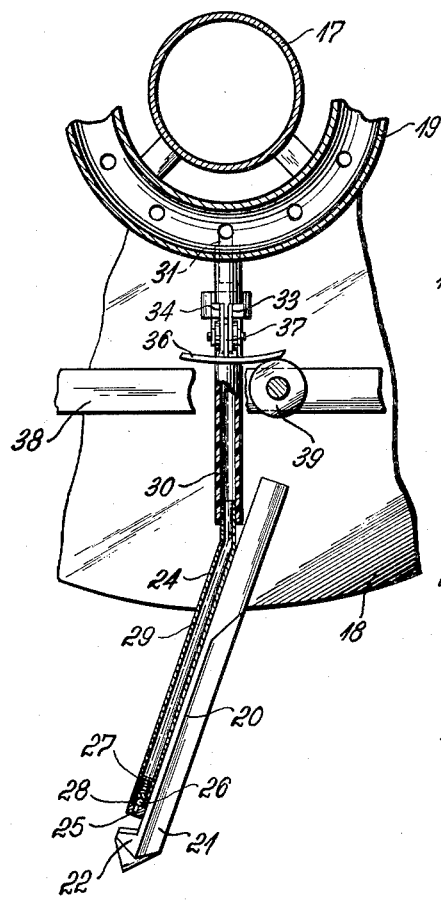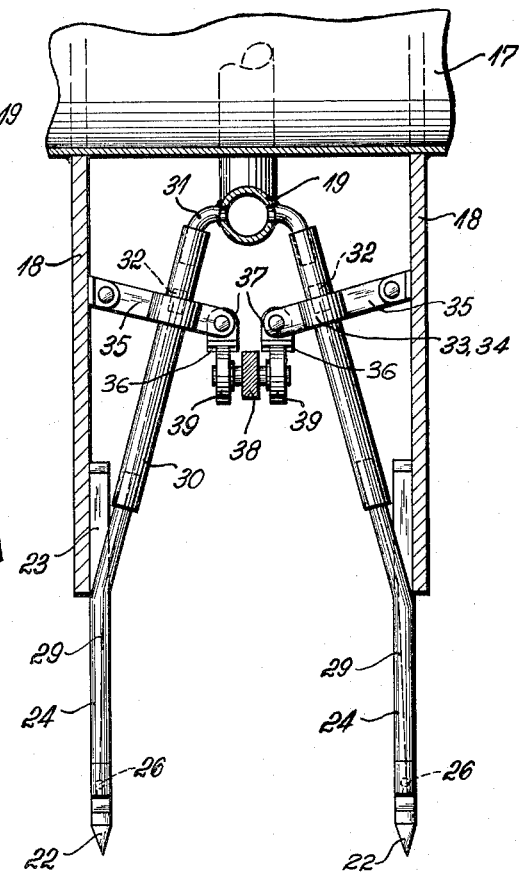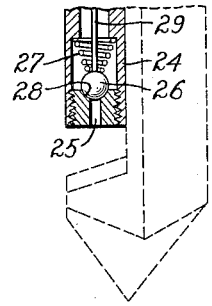

United States Patent Office 3,211,114
Patented Oct. 12, 1965

3,211,114
ROTARY KNIFE ASSEMBLY FOR INJECTING
LIQUID INTO THE SOIL
Bruno Ucinhaska, Bochum, Germany, assignor to Ruhr-Stichstoff Aktiengesellschaft, Bochum, Germany, a corporation of Germany
Filed Sept. 16, 1963, Ser. No. 309,234
Claims priority, application Germany Aug. 8, 1963
6 Claims. (Cl. 111—7)

This invention relates to apparatus for introducing liquid substances into the surface layer of soil, and more particularly to apparatus for introducing a fertilizer such as liquid ammonia into the surface of soil.

Devices known as fertilizer drums have been proposed for introducing liquid fertilizers into soil. Such devices include a drum wheel arrangement having a plurality of knife-like jet elements disposed equidistantly about its periphery, each knife-like jet element being in the form of a hollow body which contains a passageway for the liquid to be conducted from the center of the drum wheel to jets at the tips of the knives. The passageway for each individual knife-like jet element is shut off by means of a valve which is disposed within the central portion of the drum. This valve is provided with a control which operates such that the valve is opened only when the knife-like jet element is projected into the soil with the jet beneath the surface.

One important disadvantage of liquid fertilizer distributors of the type described is that because of the location of the valves at the inner ends of the jet elements, expansion of the pressurized liquid fertilizer occurs within the knife-like elements, the expansion being accompanied by a refrigeration effect whereby the jet elements are cooled and subject to possible freezing. In addition, the fertilizer within the hollow jet element is capable of escaping through the valve even when it is shut off, thereby causing losses of fertilizer.

As an overall object, the present invention seeks to provide apparatus for introducing liquid substances into the surface layer of soil which overcomes the above and other disadvantages of prior art devices of this type.

More specifically, an object of the invention is to provide apparatus for introducing substances, such as liquid fertilizers, into the surface layer of soil wherein radial knives are provided around the periphery of a disc or circular frame and wherein feeder pipes are provided at or within the knives, the apparatus being characterized in that the feeder pipes are provided with automatic valves at the ends of the knives controlled by means of a mechanism which, during rotation of the disc or circular frame, is actuated by a control element located in the vicinity of the center of the disc when the corresponding knife is in the vicinity of its lowest position.

In accordance with the invention, there is provided movable apparatus for introducing liquids into the surface layer of soil comprising a disc or circular frame having a plurality of knives circumferentially spaced around its periphery for penetrating the soil, feeder pipes in or adjacent the knives provided with openings near the knife tips, valve devices in said openings, and mechanism located near the center of the disc for opening each valve device when its corresponding knife is near its lowest position and disposed within the soil. Preferably, the feeder pipes are disposed at the rear sides of the knives with the front of each knife being provided with a cutting edge to facilitate its penetration into the soil surface.

The novel mechanism for opening each valve device in accordance with the invention is disposed preferably within the feeder pipe and comprises a cable or other similar mechanism which extends upwardly through the pipe. The lower portion of the feeder pipe is rigid; however the upper portion is formed from elastic material containing an element such as a sleeve to which the aforesaid cable is connected. Means are provided for subjecting the elastic pipe to a pulling action in an axial direction of the pipe and, hence, the pull is also effective upon the sleeve in the elastic pipe and the cable to which it is connected to open the valve. When the pull upon the elastic pipe ceases, the pipe returns to its resting position; and the valve for the outlet opening closes.

The individual discs which support the knife-like elements may either consist of solid material or comprise framework structures or frames. Preferably, a set of discs or circular frames which support the radially-arranged knives are mounted in parallel on a shaft with the shaft also carrying the containers for distributing the liquid which flows through the knife-like elements. The shaft is rotatably mounted in a horizontal frame such that the knives together with the feeder pipes and the control elements rotate around the same central axis.

The above and other objects and features of the invention will become apparent from the following detailed description taken in connection with the accompanying drawings, in which:

FIGURE 1 shows a plan view of the apparatus of the invention including the discs which carry the knives and including the containers for distributing the liquid fertilizer, but wherein the flexible pipes and control elements are omitted for purposes of simplicity;

FIG. 2 is a side view at a larger scale of the apparatus shown in FIG. 1 as seen in the direction of arrow II of FIG. 1;

FIG. 3 is a cross-sectional view, at a scale still larger than that of FIG. 2, of two adjacent discs as viewed in the direction of travel (i.e., in the direction of the arrow III of FIG. 1), and also showing the container for the liquid disposed between the discs;

FIG. 4 is a top view of a portion of a disc including a knife and the control element for actuating the outlet valve; and FIG. 5 is an enlarged cross-sectional view of the outlet valve shown in FIG. 4.

Referring now to the drawings, the apparatus shown is often referred to as a fertilizer drum and is designed to be connected to a tractor. The knives of the apparatus are intended to penetrate the soil a predetermined depth either by way of the weight of the fertilizer drum itself or by virtue of an additional force effective upon the drum in a vertical direction.

The illustrated apparatus as best shown in FIGS 1 and 2 is intended for the purpose of introducing liquid ammonia into the surface of the soil and comprises a rectangular horizontal frame 10 consisting of two short longitudinal end rails 11 and longer cross rails 12 and 13, with the cross rail 12 being in the front of the apparatus and the cross rail 13 in the rear. The frame is supported by means of two supporting wheels 14 in the rear and a hook 15 disposed at the front cross rail 12, the hook 15 being adapted for connection to a tractor schematically illustrated at T.

Rotatably supported by two bearings 16 carried on the cross rails 11 is a hollow shaft 17. Carried on shaft 17 are eight discs 18 forming a circular frame together with tubular rings 19 which are disposed respectively between each two adjacent discs 18. As will hereinafter be understood, the tubular rings 19 are provided for the purpose of distributing the liquid to the knife-like elements 20 of the invention. The four tubular rings 19 may be connected to a pressure tank, not shown, which contains the liquid ammonia.

As best shown in FIG. 2, twelve knives 20 are equidistantly disposed around the periphery of each disc 18, the knives 20 being provided with a cutting edge 21 at their front edge (FIG. 4) and with a projecting tip 22 for the purpose of digging into the soil. A pipe section 24, as best shown in FIGS. 3 and 4, is welded to the rear of each knife, the pipe section comprising a lower straight portion extending parallel to the knife and an upper portion which is at an angle with respect to the knife. The pipe section 24 is provided with an outlet opening 25, FIG. 5, at its lower end for the liquid fertilizer. This opening is normally closed by means of a ball valve 26 which is held against a valve seat 28 by means of a compression spring 27. The ball valve 26 is engaged by a pull wire 29 disposed within the pipe section 24 for the purpose of disengaging the ball valve 26 from its seat 28 in a manner hereinafter described.

The rigid pipe section 24 is connected at its upper end to an elastic pipe section 30. The upper end of the elastic pipe section is, in turn, connected to a rigid pipe section 31 which communicates with the interior of one of the tubular rings 19.

A sleeve 32 (FIG. 3) is inserted into the elastic pipe section 30, and the upper end of the pull wire 29 is secured to the sleeve 32 such that the wire within the pipe sections 24 and 30 is in a taut state even when the valve 26 is seated on seat 28. At the location of the sleeve 32, the elastic pipe section 30 is enclosed by two angle pieces 33 and 34 which are secured at the leg portions thereof to an associated one of the discs 18. At the other end of the angle pieces 33 and 34 is an arcuate strap or cam 36, having an upwardly-projecting portion 37 which is clamped between the two angle pieces 33 and 34.

Between the crossbar 12 at the front of the apparatus and the crossbar 13 at the rear there are disposed, respectively, flat rails 38 (FIGS. 2, 3 and 4) between each two discs, the flat rails being inclined downwardly and having rotatably mounted thereon twin wheels 39, the peripheral surfaces of which engage the arcuate straps 36.

In operation, movement of the apparatus in the direction of arrow 40 shown in FIGS. 1 and 2 will cause the discs 18 to rotate in a counterclockwise direction as viewed in FIG. 2 with the knives 20 penetrating the soil in succession at the lowest point of rotation. When the angle between the knife tip 22 and the vertical falls below a predetermined value, for example 15°, the arcuate strap 36 makes contact with the peripheral surface of one of the twin wheels 39, thereby applying an upwardly directed pulling force upon the elastic pipe section 30. Hence, the sleeve 32 within the elastic pipe section moves upwardly also. In this process the wire 29 which is connected to the sleeve 32 pulls the valve 26 upwardly from the seat 28, thereby permitting the liquid ammonia to discharge through opening 25. As the knife 20 continues through its path of rotation, the arcuate strap 36 separates from the peripheral surface of its associated wheel 39, whereupon the compression spring 27 causes the valve 26 to close. Consequently, the feeder pipes for the liquid ammonia are opened only for a period of time during which the knife tip is in the soil, and losses of ammonia are avoided.

As mentioned above, the flat rails 38 which support the twin wheels 39 for controlling the valves 26 are fastened at their opposite ends to the front and rear crossbars 12 and 13. The rails 38 are adjustable in height by means, not shown, such that the twin wheels 39 are also adjustable in height. In this manner, the position of the angle of the knives 20 during which the knives are in the soil and the valves 26 open is adjustable and can be adapted to the condition of the soil to be fertilized and to the type of crop.

In order to prevent evaporation and escape of the liquid fertilizer introduced into the soil, the fertilizer drums are usually equipped with pressure rolls arranged behind the knives. That is, pressure rolls are usually provided in the rear portion of the apparatus behind the crossbar 13 for the purpose of covering the holes or grooves produced in the soil by the knives. Such pressure rolls are well known in the art and, consequently, are not illustrated in the drawings.

The coupling of the movable apparatus with the tractor T should be of such construction that, on the one hand, the apparatus has a horizontal position in which the knives penetrate the soil as shown in FIG. 2, and another horizontal position where the knives are higher such that they will not penetrate the soil, thereby facilitating transportation of the apparatus over highways and the like. Preferably, the coupling is accomplished by means of hydraulic lifting elements, not shown, having an essentially vertical axis and being carried on the tractor.

As was mentioned above, a certain downward force is required in order to assure penetration of the knives 20 into the soil. The elements of which the apparatus is composed, the container for the liquid, the pressure rolls, and the control elements all yield a considerable weight; however if this weight is insufficient to assure adequate penetration of the knives into the soil, additional loading weights may be distributed evenly over the apparatus as required.

The pipe rings 19 usually are not sufficient to store the amount of liquid ammonia required for long periods of operation. These annular containers may, therefore, be connected through hoses extending through the interior of the shaft 17 and through a rotary liquid coupling, not shown, to a storage tank disposed or carried on the crossbars 11, 12 and 13. In this latter case, such a storage tank causes an increase in weight of the apparatus which in certain cases is desirable for the reasons explained above in that it assists in forcing penetration of the knives 20 into the soil.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Movable apparatus for introducing liquid substances into the surface layer of soil, comprising a circular frame member, radially-extending knife elements circumferentially spaced around the periphery of said frame member and adapted to penetrate the soil in succession upon movement of the frame member over the surface of the soil, each knife element including a radially-extending passageway terminating in a jet opening at its radial outermost extremity, a normally closed valve device in each passageway adjacent said jet opening at the radial outermost extremity of the passageway, an elastic conduit connected to the radial innermost extremity of said passageway and adapted for connection to a source of liquid to be introduced into the surface layer of soil, an annular sleeve device coaxial with and carried within said elastic conduit, a pull wire extending through said passageway and said conduit and connected at one end of said valve device and at its other end to said annular sleeve, and means for imparting a radially inward force to said sleeve device when its associated knife element is in the vicinity of its lowest position in its rotational path of travel whereby the sleeve and pull wire will move radially inwardly to open the valve device.

2. The apparatus of claim 1 wherein the means for applying a radial inward force to the annular sleeve comprises a lever clamped around the elastic conduit in the vicinity of the annular sleeve and having one end pivotally connected to said frame member, a cam device at the other end of said lever member, and a roller device carried on said apparatus and arranged to engage said cam member when its associated knife element is in the vicinity of its lowermost position whereby the roller device will force the cam member, the lever and said sleeve radially inwardly to thereby produce a pulling action on the pull wire to open said valve device.

3. Movable apparatus for introducing liquid substances into the surface layer of soil, comprising a central rotatable shaft, a plurality of circular frame members axially spaced on said shaft and rotatable therewith, radially-extending knife elements circumferentially spaced around the periphery of each of said frame members and adapted to penetrate the soil in succession upon movement of their associated frame member over the surface of the soil, each knife element including a radially-extending passageway terminating in a jet opening at its radially outermost extremity, a normally closed valve device in each passageway, a plurality of circular containers for liquid to be introduced into the soil carried on said shaft between successive ones of said circular frame members, elastic tube means connecting the passageway of each knife element to an associated one of said circular containers, and means for opening each valve device when its associated knife element is in the vicinity of its lowest position in its circular path of travel around said shaft, said latter-mentioned means comprising an annular sleeve in one of said elastic tubes, a clamp surrounding said tube and sleeve, a pull wire extending through said passageway and said tube and having one end connected to said valve device and another end connected to said sleeve, and cam means operative when a knife element is in the lowest point in its circular path of travel for exerting a radial inward force on said clamp, said sleeve and said pull wire to open the valve device.

4. Movable apparatus for introducing liquid substances into the surface layer of soil, comprising a circular frame member, radially-extending knife elements circumferentially spaced around the periphery of said frame member and adapted to penetrate the soil in succession upon movement of the frame member over the surface of the soil, each knife element including a radially-extending passageway terminating in a jet opening at its radial outermost extremity, a normally closed valve device in each passageway adjacent said jet opening at the radial outermost extremity of the passageway, axially expansible conduit means connected to the radial innermost extremity of said passageway and adapted for connection to a source of liquid to be introduced into the surface layer of soil, generally tubular means carried within said axially expansible conduit means, pull wire means extending through said passageway and said conduit means and connected at one end to said valve device and at its other end to said tubular means, and means operatively connected to the tubular means for imparting a radially inward force to said tubular means when its associated knife element is in the vicinity of its lowest position in its rotational path of travel whereby the tubular means and pull wire device will move radially inwardly as the conduit means expands along its axis to open the valve device.

5. The apparatus of claim 4 and including spring means normally closing said valve device, and wherein said pull wire means is flexible.

6. The apparatus of claim 4 wherein the generally tubular means is coaxial with the axial expansible conduit means, and wherein the means for imparting a radially inward force to the tubular means includes a clamp surrounding the expansible conduit means and frictionally secured to the tubular means.

References Cited by the Examiner

UNITED STATES PATENTS

| | | | |
|---|---|---|---|
| 1,954,698 | 4/34 | Giddings | 111—7.2 |
| 2,384,469 | 9/45 | Kalix. | |
| 3,025,806 | 3/62 | Peck | 111—6 |

FOREIGN PATENTS

| | | |
|---|---|---|
| 1,107,575 | 10/55 | France. |
| 1,047,519 | 12/58 | Germany. |

ABRAHAM G. STONE, *Primary Examiner.*

WILLIAM A. SMITH, III, *Examiner.*